United States Patent [19]
Norris

[11] 4,199,240
[45] Apr. 22, 1980

[54] FILM PACK FOR SMALL FORMAT FILM UNITS

[75] Inventor: Philip R. Norris, North Reading, Mass.

[73] Assignee: Polaroid Corporation, Cambridge, Mass.

[21] Appl. No.: 902,061

[22] Filed: May 2, 1978

[51] Int. Cl.[2] ...................... G03B 17/50; G03B 19/10; G03B 13/12; G03B 17/26

[52] U.S. Cl. ...................................... 354/86; 354/159; 354/212; 354/222

[58] Field of Search .................................... 354/83-86, 354/159, 210, 212, 222

[56] References Cited

U.S. PATENT DOCUMENTS

| | | | |
|---|---|---|---|
| 681,250 | 8/1901 | Neill | 354/178 |
| 2,232,440 | 2/1941 | Bisschop | 354/222 |
| 2,268,417 | 12/1941 | Neuschafer | 354/278 |
| 2,471,522 | 5/1949 | Garrett et al. | 96/68 |
| 2,495,111 | 1/1950 | Land | 354/87 |
| 2,525,720 | 10/1950 | Pinkham | 354/85 X |
| 2,805,608 | 9/1957 | Leitz et al. | 354/166 |
| 2,933,993 | 4/1960 | Bachelder et al. | 354/86 |
| 2,970,509 | 2/1961 | Barthruff | 354/222 |
| 3,212,422 | 10/1965 | Nerwin et al. | 354/199 |
| 3,225,671 | 12/1965 | Friedman | 354/174 |
| 3,550,515 | 12/1970 | Erlichman | 354/173 |
| 3,586,501 | 6/1971 | Norquist et al. | 96/29 R |
| 3,615,541 | 10/1971 | Hubert | 96/76 C |
| 3,760,702 | 9/1973 | Seiden | 354/118 |
| 3,765,373 | 10/1973 | Faris et al. | 354/210 |
| 3,958,261 | 5/1976 | Land et al. | 354/295 |

*Primary Examiner*—Richard A. Wintercorn
*Assistant Examiner*—Shelley Wade
*Attorney, Agent, or Firm*—Leslie J. Payne

[57] ABSTRACT

A film pack by which an existing camera system is adapted to expose and process small format film units. The film pack includes a plurality of film unit and carrier assemblies stacked in a standard film pack container designed to fit the film well of the existing camera. The carrier of each assembly is dimensioned to fit the interior of the container and to support the film unit mounted thereon properly in relation to the optical system of the camera. Each carrier is preferably formed as a two-part assembly to include a film unit carrier slidably supported by an envelope. The carrier and the envelope cooperate with the camera carried processing components in a manner to enclose the film unit in a dark chamber as it is discharged from the camera. Also, a viewfinder mask is provided for the existing camera so that a viewed image will be correlated with the reduced image format of the film unit in the film pack.

21 Claims, 13 Drawing Figures

FIG. 4.
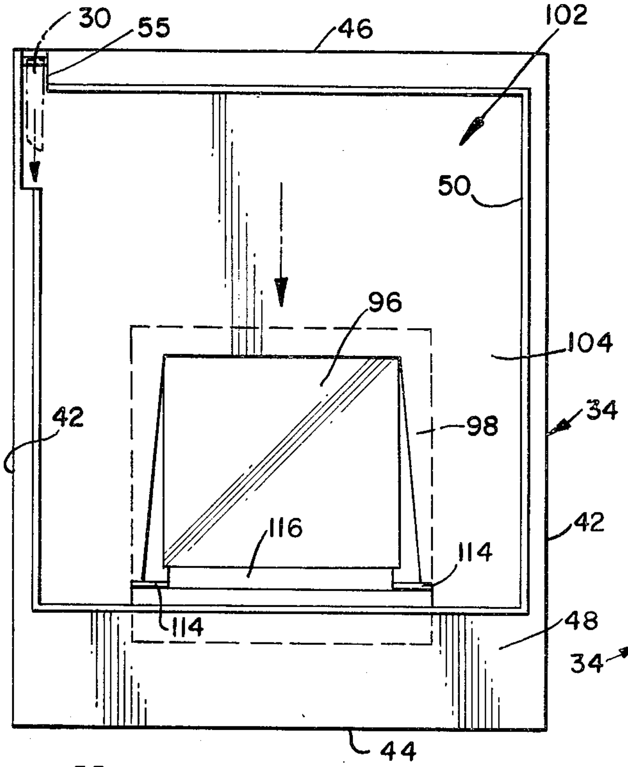
FIG. 5.
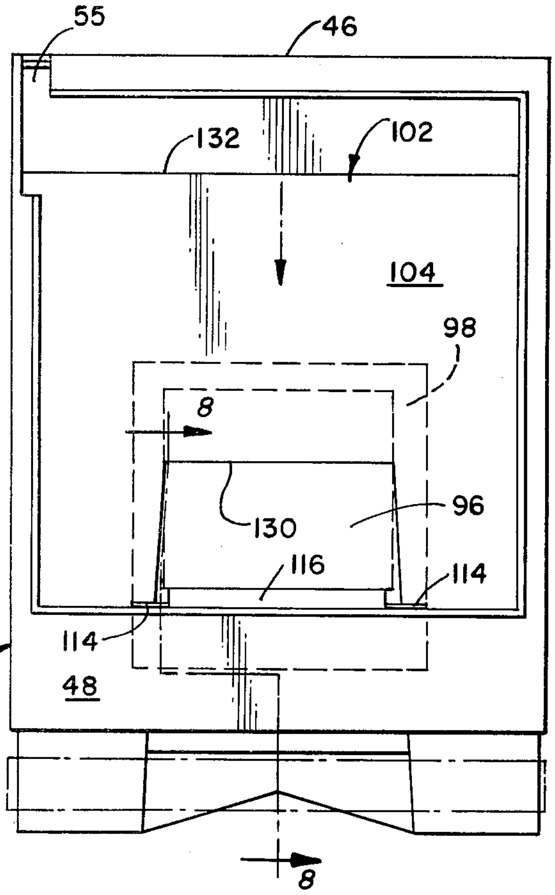
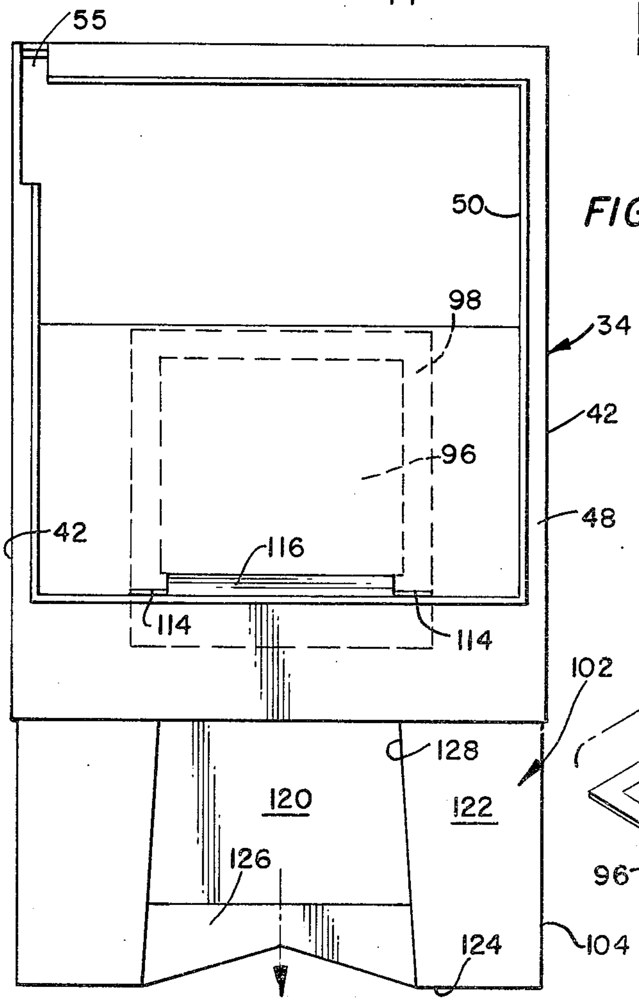
FIG. 6.
FIG. 7.
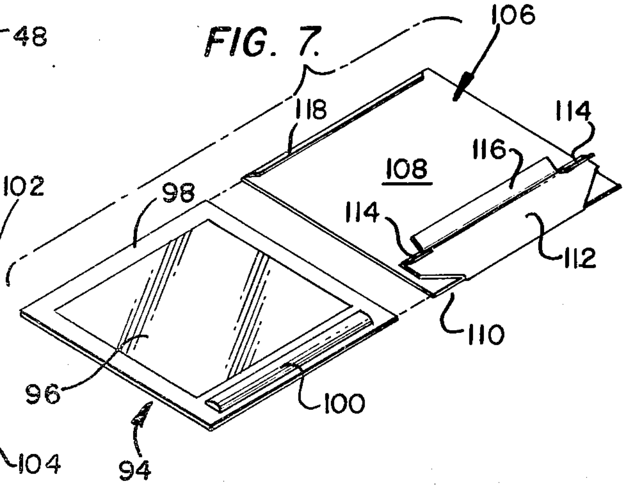

FIG. 11.
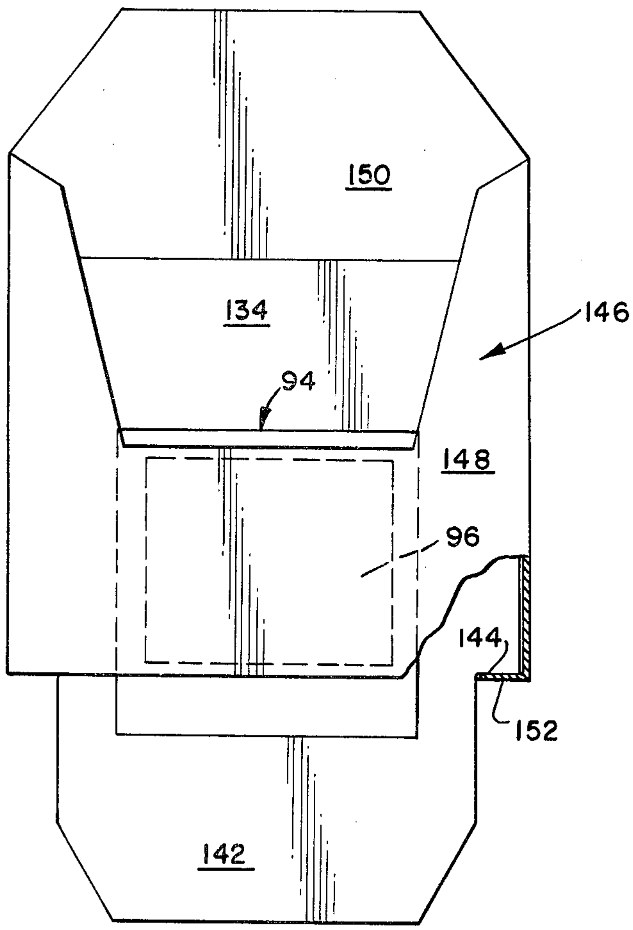
FIG. 12.
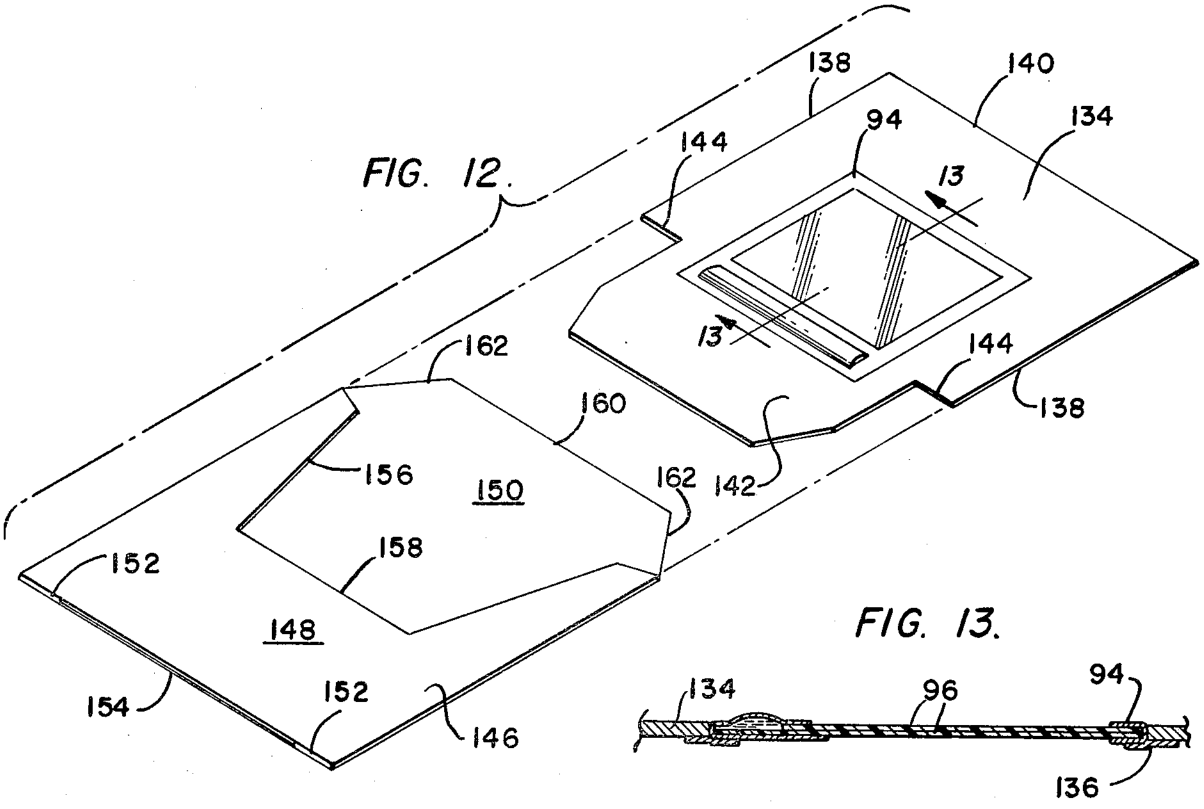
FIG. 13.

FILM PACK FOR SMALL FORMAT FILM UNITS

BACKGROUND OF THE INVENTION

This invention relates to photographic systems and more particularly, it concerns apparatus for accommodating modified format sizes of photographic sheet film in existing camera systems.

In the camera system marketed by Polaroid Corporation under the trademarks "Polaroid SX-70 Land Camera" and "Polaroid SX-70 Land Film", camera structure and operation are integrated with a container or pack of film in the sense that electric power for camera operation is supplied by a battery packaged with each film pack, a main power switch is closed upon full insertion of the film pack to connect the battery with camera carried electric circuitry, and the film container defines the location of each film unit during exposure relative to the focal plane of the camera. Each film unit in the system carries a supply of processing fluid in an amount calibrated to cover the image format area thereof after exposure and as a result of passage of the film unit between a motor driven processing roller pair supported in the camera. In particular, the processing fluid is spread across the interface between a pair of plastic sheets in each unit, at least one of which plastic sheets is transparent for exposure of a light sensitive layer carried between the sheets and so that the resulting positive photographic image may be viewed.

Because of the construction of each film unit, its exterior appearance is that of a framed photograph in which four marginal edges are defined by paper or other similar material folded about these edges to secure the two plastic sheets in overlying coextensive relationship. The bottom marginal edge of the framed photograph is wide relative to the marginal side and top edges principally because it encloses the pod or supply of processing fluid carried by each film unit. Also, because of the construction of the units, the top wall of the container in which the film sheets are contained is provided with marginal lips dimensioned to substantially cover the framing margins of the photographic film unit including the bottom marginal edge in which the processing fluid pod is located.

In the operation of the system, the uppermost film unit in the container is exposed and then engaged at its rear edge (the top edge of the photograph) by a linearly driven pick and advanced through a slot in the front wall of the container for a distance calibrated to place the leading edge of the exposed film unit (the bottom edge of the photograph) within the nip of the processing roller pair. The rollers then feed the exposed unit forwardly to first rupture the processing fluid pod, spread the processing fluid across the interface between the plastic sheets and finally discharge the exposed and processed unit from the camera.

The outside dimensions of each unit of the presently available "Polaroid SX-70 Land Film" are approximately 89×108 mm to provide a substantially square image area approximately 79 mm on the side. The width of the framing margin at the bottom of the photograph is approximately 19 mm whereas the framing margins at the side and top edges of the photograph are approximately 5 mm. While the dimensions of the photograph are well suited for storage in albums or the like, versatility of such systems would be enhanced significantly by a capacity for exposing and processing smaller format photographs, particularly positive transparencies on the order of a 35 mm format for use in a projector designed to handle 2" by 2" slides.

Because of system design, the adaptation of such small format photographs, due to reduced size alone, gives rise to such problems as positioning smaller format film units properly within the existing film well of the camera and accommodation of the smaller format film units by camera carried components such as the camera viewing system, the pick by which each film unit is advanced from the film pack container, the positioning of processing rollers carried by the camera and the like.

Additional problems are associated with adapting the existing system to the formation of positive transparencies. As above-mentioned, the light sensitive materials in which the photographic image is formed in the existing system are carried between two plastic sheets of each film unit. In the standard film unit, the top one of the two plastic sheets is transparent for exposure of the light sensitive layer and for viewing but the back sheet of the standard film unit is opaque. The photochemical materials contained in each standard film unit includes an opacifying agent to protect light sensitve chamicals from ambient light during an imbibition period of several minutes in order to allow complete processing of photographic materials contained in the film unit after the unit is ejected from the camera. Where both plastic sheets of the unit are transparent, as would be required to provide a positive transparency, it is not possible, given the current state of the art, to duplicate the opacifying agent function with chemicals. thus, some provision must be made for protecting the exposed film unit for the imbibition time after it is ejected from the camera.

SUMMARY OF THE PRESENT INVENTION

In accordance with the present invention, small format film units are adapted for exposure and processing in a camera designed to handle larger, standard format film units by releasably mounting each small format unit on a carrier having outside peripheral dimensions corresponding to those of the standard format film units. The individual assemblies of mounted film units and carriers are stacked in a standard film pack container and thus insertable directly into the existing camera of the system. As each assembly is presented at the focal place of the camera, the film unit is exposed and the carrier advanced to the processing rollers of the camera. Passage of the assembled unit and carrier through the processing rollers will spread the processing fluid of the unit in conventional fashion and discharge the carrier and unit from the camera. The unit is then separated from the carrier and the carrier discarded.

To enable processing of the small format film units as positive transparencies, the carrier is constructed to provide a dark chamber into which the film unit moves after exposure so that when the assembly of the carrier and film unit is ejected by the camera into ambient light, the film unit will be enclosed in the dark chamber. The dark chamber is established by forming the carrier of two relatively movable parts; namely, a carrier slide and an envelope. The carrier slide and envelope are moved relative to one another upon initial translation of the assembly from the film pack container to the processing rolls. Specifically, this initial movement results first in a relative movement of the carrier slide and film unit mounted thereon into the dark chamber established by the envelope portion of the carrier.

Among the objects of the present invention are, therefore: the provision of a photographic system in which an existing camera designed for relatively large format film units is adapted for exposure of relatively small format film units; the provision of such a system which is capable of exposing and processing film units carrying a supply of processing fluid; the provision of such a system which requires a minimal modification of existing camera structure; the provision of such a system which facilitates processing of film units to provide positive transparencies; the provision of a unique film pack for use in such camera systems and by which film units of reduced format sizes are readily accommodated; the provision of a film unit assembly by which a film unit is protected from ambient light upon discharge of the assembly from the camera of such systems; and the provision of a unique viewfinder masking arrangement by which the viewfinder of an existing collapsible camera may be adapted to small format film units.

Other objects and further scope of applicability of the present invention will become apparent from the detailed description to follow taken in conjunction with the accompanying drawings in which like parts are designated by like reference numerals.

BRIEF DESCRIPTION OF THE DRAWINGS

FIG. 4 is a plan view of a film pack incorporating the present invention;

FIG. 5 and 6 are respectively plan views corresponding to FIG. 4 but showing components in different relative positions;

FIG. 7 is a perspective view illustrating a film unit and film unit mount used in the embodiment illustrated in FIGS. 4–6;

FIG. 11 is a plan view of a film unit and carrier assembly of the embodiment illustrated in FIGS. 9 and 10;

FIG. 12 is an exploded perspective view of the carrier assembly illustrated in FIG. 11; and FIG. 13 is an enlarged fragmentary cross-section on line 13—13 of FIG. 12.

DETAILED DESCRIPTION OF THE PREFERRED EMBODIMENTS

Figure 1:
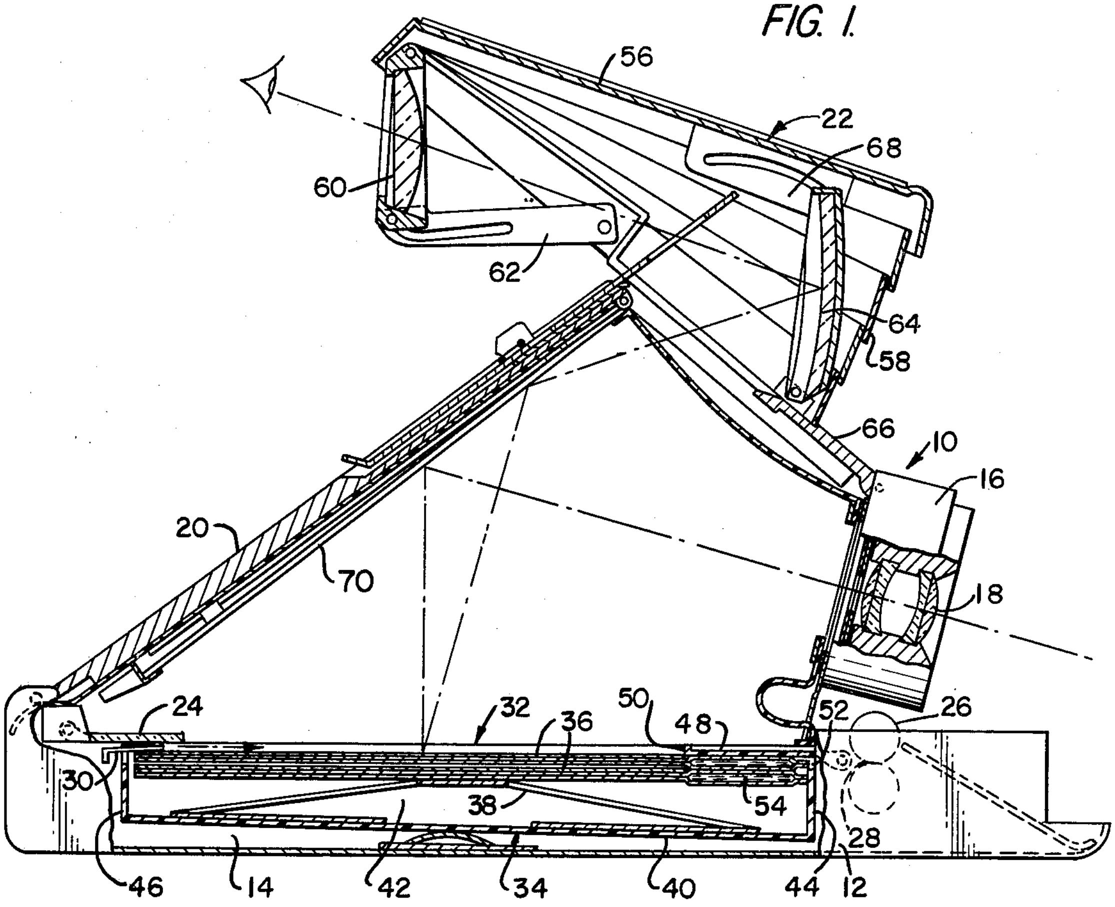
FIG. 1 is a longitudinal cross-section depicting operating components of a foldable single lens reflex camera in which the present invention may be used.

In FIG. 1 of the drawings, a foldable, single lens reflex camera 10 is shown to include a body 12 defining a film pack well 14, a shutter housing 16 supporting an objective lens 18, a foldable cover member 20 and a viewfinder 22. A reflex mirror 24 (only partially shown in FIG. 1) is pivotally supported by the body 12 for movement between a viewing position in which it overlies the well 14, and an exposure position in which it lies against the underside of the cover member 20. The camera 10, as thus constituted, is now well-known and available commercially under the trade designation "The Polaroid SX-70 Land Camera".

In addition to the components identified in the preceding paragraph, the camera includes as existing components, a processing roller pair 26 defining a pressure nip 28 and a linearly driven pick 30. In FIG. 1, the camera 10 is shown loaded with a conventional or standard film pack 32 defined by a container 34 which houses a plurality of overlying film units 36 biased upwardly by a leaf spring follower 38. As shown in FIG. 1 and also in FIGS. 4–6 of the drawings, the container 34 includes a bottom wall 40, side walls 42, a front wall 44, a rear wall 46 and an upper marginal wall 48 defining a rectangular opening or window 50 through which the uppermost of the film units 36 may be exposed. The front wall 44 of the container is provided at its upper end with a slot 52 through which the uppermost film unit 36 may be advanced forwardly to the pressure nip 28 of the processing roller pair 26. As is well-known, this operation ruptures a processing fluid pod 54 contained in each film unit and spreads the processing fluid uniformly over the image format area of each sheet assembly 36. Also, the left rear corner of the back wall 46 is cut away, as is the upper marginal wall 48 in this region so that the pick 30 may engage the rear edge of the uppermost film unit 32 to advance this unit through the slot 52 until the leading edge of the unit is engaged by the pressure nip 28. This cut out portion of the container 34 is designated by the reference numeral 55 in FIGS. 4–6 of the drawings.

The viewfinder 22 of the camera 10 is an articulated assembly of components designed to be self-erecting to an operative condition illustrated in FIG. 1 when the cover 20 and the shutter housing 16 are erected to the condition shown from a collapsed storage condition. To facilitate this operation, the viewfinder includes a plate-like cover 56 from which a skirt-like collapsible bellows 58 depends about the front and side portions of the cover. An eye piece 60 is pivotally supported from the rear edge of the cover 56 is movable from the position shown in FIG. 1 to a collapsed condition against the cover 56 under the control of a slotted lever pair 62. The eye piece 60 is aligned optically with a foldable concave mirror 64 pivoted from a front part 66 of the camera cover assembly for movement from the erected position shown downwardly under the cover 56 under the control of a slotted lug pair 68 fixed to the underside of the cover 56.

In the operation of the viewfinder 22, the optical path of light from a subject to be photographed proceeds from the lens 18 to a mirror 70 fixed to the underside of the cover member 20, downwardly to the top of the reflex mirror 24, upwardly to the mirror 70, to the concave mirror 64 and to the eye piece 60, all as represented by the dashed lines illustrated in FIG. 1. In the standard camera, the optical components are calibrated so that a real image of the viewed subject is formed in space at a point intermediate the eye piece or lens 60 and the concave mirror 64. The eye piece 60 is, therefore, a lens arranged to focus on that real image which is related, in terms of format area, to the opening 50 in the top wall of the film pack container 34. As an incident to correlating the optics of the viewfinder 22 to a film unit having a reduced image format area, viewfinder masking arrangements shown in FIGS. 2 and 3 of the drawings are provided. In the embodiment of FIG.

2, a removable viewfinder mask 72 is shown to include a thin sheet of metal or other similar form sustaining opaque material to define a generally trapezoidal mounting portion 74 from which a mask portion 76 extends. A window 78, corresponding in size to a reduced image format and taking into account the optical parameters of the viewfinder 22, is provided in the mask portion 76.

The trapezoidal configuration of the mounting portion 74 complements the shape of a viewfinder recess 80 provided in the cover member 20 of the existing camera 10. A mount 82 for the mask 72 is secured by pressure-sensitive adhesive, for example, to the upper edge of the cover. The mount 82 has a pair of projecting lugs 84 positioned so as not to interfere in any way with collapsibility of the viewfinder 22 and the camera 10. The lugs are further positioned to extend through slots 86 in the trapezoidal body portion 74. The mask 72 is removably secured in place by a detent spring 88 engaging the lugs 84.

Figure 3:
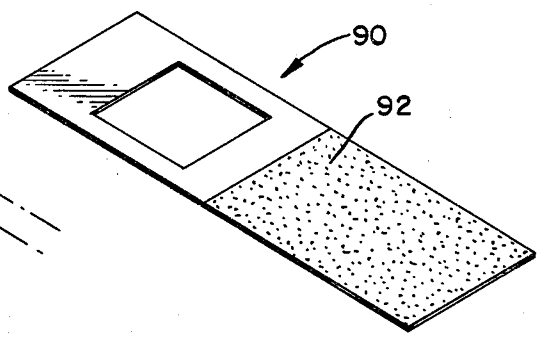
FIG. 3 is a modified embodiment of the viewfinder mask illustrated in FIG. 2.

An alternative embodiment of the viewfinder mask is shown in FIG. 3 and designated by the reference numeral 90. In this instance, the mask is a simple sheet of opaque material provided with an area of pressure-sensitive adhesive 92 to facilitate its being removably secured against the base of the viewfinder recess 80. By use of appropriate indicia (not shown) the mask may be positioned properly in the path of the viewfinder as shown in FIG. 1 of the drawings and left remaining in place even though the camera 10 and the viewfinder 22 is collapsed to a storage condition.

Figure 2:
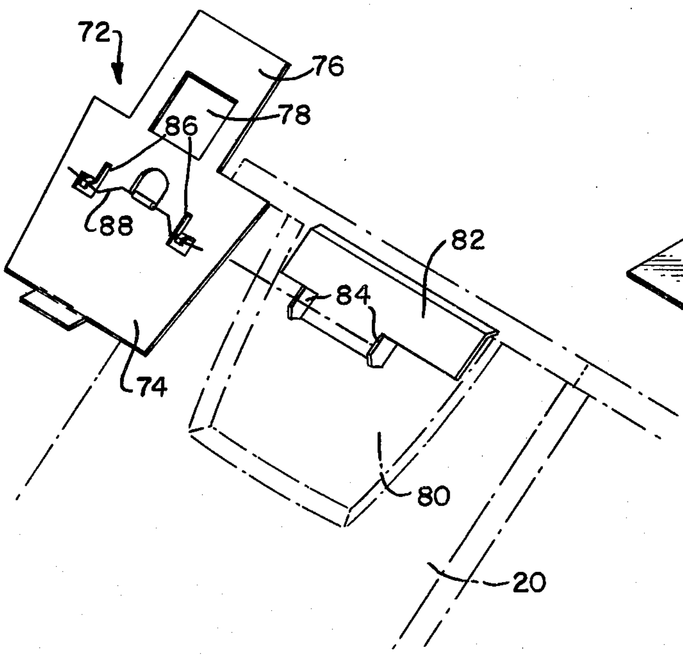
FIG. 2 is an exploded perspective view illustrating a viewfinder mask in accordance with the present invention.

In both the embodiments of FIGS. 2 and 3, the mask window is located approximately at the point between the eye piece 60 and the mirror 64 where the real image of the viewed subject is formed. Because of this, the eye piece 60 will focus on the mask window 78 and thus facilitate a correlation of the window dimensions with those of reduced format area.

Figure 8:
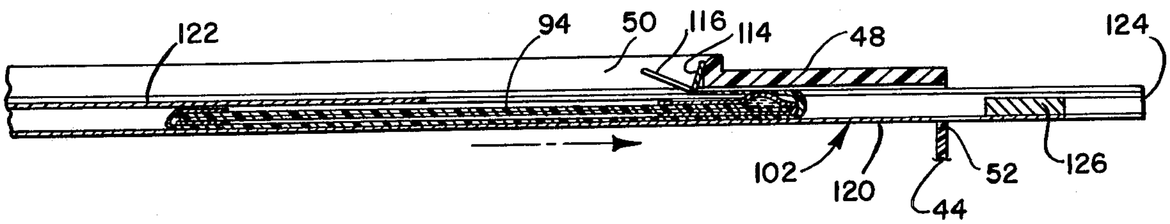
FIG. 8 is an enlarged fragmentary cross-section on line 8—8 of FIG. 5.

In FIGS. 4–8 of the drawings, one embodiment of a small format film pack for use in the standard camera 10 is illustrated. In FIGS. 7 and 8, a small format film unit, designated generally by the reference numeral 94 is shown to be of a construction similar to the standard film unit. As such, the unit 94 includes a pair of plastic sheets 96 retained in a superimposed relationship by a marginal frame 98 of paper or other suitable material secured about the edges of the sheets 96 by appropriate adhesives or the like. A processing fluid pod 100 is located in the lower framing margin, in the context of the photograph to be produced, or in the leading margin of the unit 94 in the context of orientation of the film unit in the camera 10 and passage through the processing rollers 26. The film unit 94 is intended to provide, when exposed and processed, a photographic positive transparency in which an image is provided over the area of the exposed plastic sheets 96. The size of the marginal framing 98 may vary slightly but preferably is selected to correspond with the dimensions of a 2″ by 2″ slide transparency. Consistent with such slides, the image format area established by the exposed plastic sheets 96 could in practice approximate a 35 mm film format.

The small format film pack shown in FIGS. 4–8 of the drawings includes the standard container 34 together with such other components as the spring follower 38 and the storage battery (not shown) as are conventionally provided in the standard film pack. In accordance with the present invention however, the film units 36 of the standard film pack are replaced by sheet-like assemblies of the small format film units 94 and a carrier 102, such assemblies being stacked in the container 34 over the spring follower 38 (See FIG. 1). The construction of the carrier 102, as well as the assembly therewith of the film unit 94 is shown most clearly in FIGS. 4 and 6–8 of the drawings. Each carrier 102 includes as separate parts an envelope 104, having a rectangular peripheral configuration to fit within the container 34 in the same manner as the standard film unit 36, and a carrier slide 106.

The carrier slide 106 is preferably formed of thin synthetic resinous material or resin impregnated paper which is resilient and capable of yieldably retaining a folded conformation. As shown in FIG. 7, the carrier slide 106 is shaped to establish a base panel 108 formed at its leading edge 110 with a rearwardly folded panel 112 of a size adapted to overlie the marginal edge of the base panel 108 and at opposite edges thereof, a pair of forwardly struck tabs 114 are formed. A rearwardly struck tab 116 extends between the tabs 114. Also a rear tab 118 is formed on the trailing or rear edge of the base panel 108. The base panel 108 is of a size to complement the exterior dimensions of the film unit 94 and such that when the unit 94 is placed on the base panel 108, it will be retained with the carrier slide as a result of the panel 112 and the rear tab 118.

The envelope 104 is formed of opaque material such as black paper and as shown most clearly in FIGS. 6 and 8, includes a full back panel 120 closed on the side and rear edges with a front panel 122. The edges of the panels 120 and 122 at the leading edge 124 of the carrier 102 are opened and spaced by a filler 126 which may be of cardboard or similar material. As may be seen in FIGS. 5 and 6, the front panel 122 of the envelope 104 is provided with a trapezoidal cutout 128 extending from the leading edge 124 to a linear transverse edge 130. The edge 130 is positioned so that the distance from it to the rear edge 132 of the envelope 104 exceeds the combined fore and aft dimension of the marginal edge 98 of the unit 94 opposite the processing fluid pod 100 and the fore and aft dimension of the image format area defined by the exposed plastic sheets 96.

The film units 94 are each assembled with a carrier 102 by first placing the film units into the carrier slide 106 and then inserting the unit 94 and the slide 106 as a sub-assembly into the envelope 104. The assembly of the unit 94 and the carrier 102 are then conventionally stacked in the container 34 to be positioned initially as shown in FIG. 4 of the drawings. In this initial position, it will be noted that the complete image format area of the film unit 94 is presented through the opening 50 in the container 34. After the uppermost film unit 94 in the container 34 has been exposed in the camera 10, the camera pick 30 will move forward to engage the rear left-hand corner of the carrier 102 so that it and the film unit 94 assembled therewith will be advanced forwardly through the slot opening 52 in the front wall 44 of the container (FIGS. 5 and 8). Because of the forwardly struck tabs 114 on the carrier slide 106, however, continued forward movement of the slide 106, and thus also of the film unit 94, will be prevented by engagement of the tabs 114 with the forward marginal edge of the opening 50 in the container 34. Since at this time, the leading edge 124 will have passed between the processing roller pair 26 in the camera, the envelope 104 will be advanced and the film unit 94 with the carrier slide 106 retained. When the linear edge 130 of the cutout 128 in the front panel 122 in the envelope engages the rearwardly struck tab 116, continued forward movement of the carrier by the processing roller pair 26 will cause the tabs 114 to deflect rearwardly and pass the assembly of the carrier 102 and the film unit 94 forwardly to rupture the pod 100 and spread the processing fluid contained therein uniformly throughout the interface between the plastic sheets 96 of the small format film unit. As the assembly of the carrier 104 and the film unit 94 is discharged from the camera into ambient light, the photochemical materials between the plastic sheets 96 will be protected from light by the chamber established between the front and rear panels of the envelope 104 rearwardly of the linear edge 130. After a suitable imbibition time has passed to a point where the photochemical materials contained in the film unit 94 are no longer light-sensitive, the slide 106 and the unit 94 may be removed from the envelope 104 and the envelope and the carrier slide 106 discarded.

An alternative embodiment of the film unit and carrier assembly of the present invention is illustrated in FIGS. 9–13 of the drawings. In this instance and as shown most clearly in FIGS. 12 and 13 of the drawings, the small format film unit 94 is supported by a carrier slide 134 of cardboard or other suitable material having a thickness approximating the combined thickness of the plastic sheets 96. The carrier slide 134 is provided with a generally centrally located rectangular opening in which the film unit 94 is releasably secured such as by pressure-sensitive tape 136 or other similar type material. The slide 134 is of partial rectangular configuration to establish side edges 138 and a rear edge 140 complementing the interior dimensions of the container 34. The front portion of the slide 134 is formed as a forwardly projecting tongue 142 of a transverse dimension less than the distance between the edges 138 to establish a pair of forwardly facing abutment shoulders 144. The sub-assembly of the unit 94 and the carrier slide 134 are received in an envelope 146 having front and back panels 148 and 150 respectively. The panels 148 and 150 are joined at their side edges and at portions 152 of the front edge on opposite sides of an opening 154. The opening 154 is centrally disposed in the leading edge of the envelope and is of a length slightly in excess of the width of the tongue 142.

Figure 9:
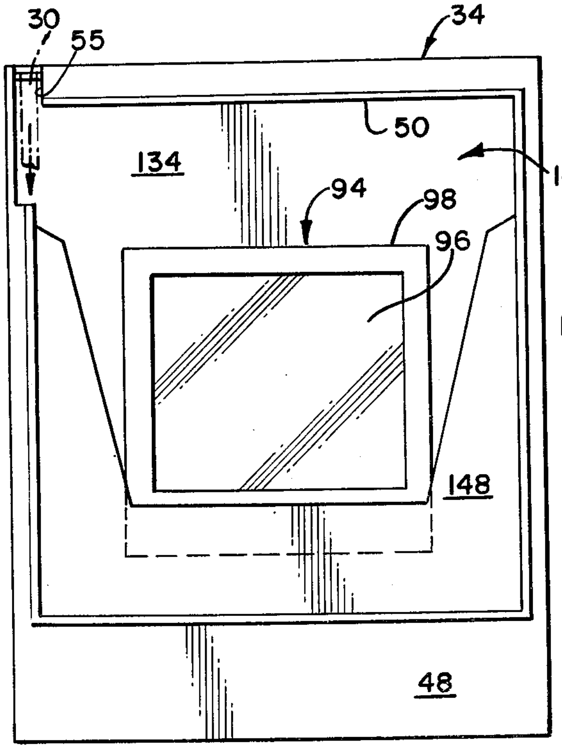
FIG. 9 is a plan view similar to FIG. 4 but illustrating an alternative embodiment of the present invention.
Figure 10:
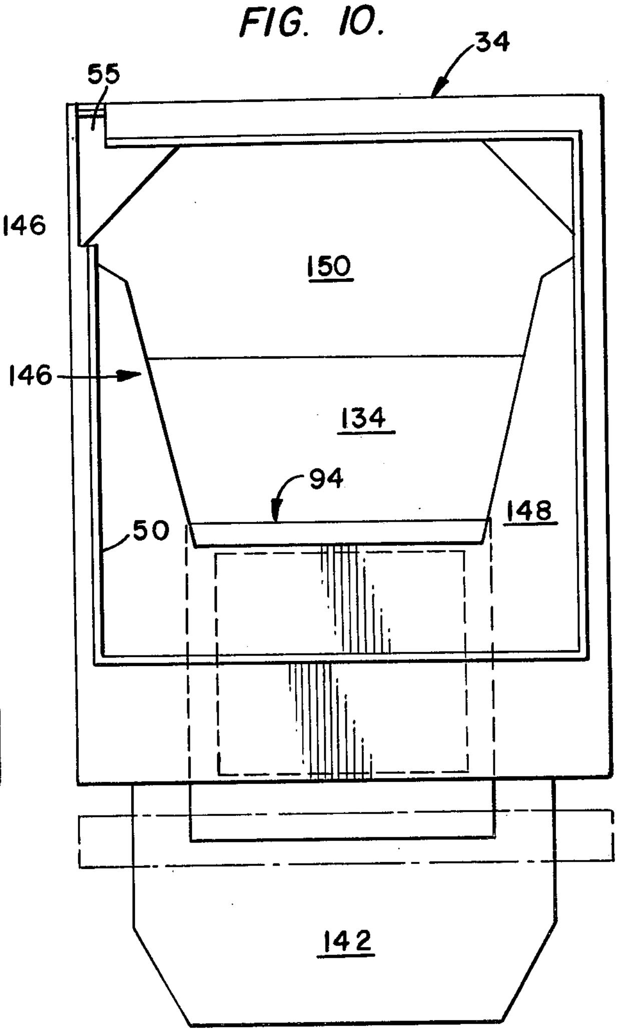
FIG. 10 is a plan view of the embodiment illustrated in FIG. 9 but with parts thereof in different physical relationship.

As in the previous embodiment, the front wall 148 is provided with a generally trapezoidal cutout 156 but in this instance terminates forwardly in a linear transverse edge 158. The back panel 150 extends to a rear edge 160 provided with tapered corner portions 162. The sub-assembly of the carrier slide 134 and the film unit 94 is assembled with the envelope 146 in a manner such that the rear edge 140 of the carrier slide 134 overlies the rear edge 160 of the envelope 146. In this condition, the tongue 142 will be contained in the envelope 146 and the film unit 94 presented through the trapezoidal opening 156 as shown in FIG. 9 of the drawings. After the film unit is exposed, the pick 30 will engage the left side of the rear edge 140 of the slide carrier to advance the tongue 142 through the opening 54 until the tongue is received in the nip 28 of the processing roller pair 26. Because of the tapered corner portions 162, the pick 30 will not engage or move in any way the envelope 146. The processing roller pair will continue to advance the carrier slide 134 until the shoulders 144 engage the closure portions 152 on the envelope. Thereafter, the complete assembly will be withdrawn from the container 34 and pass through the processing roller pair 26.

It will be noted that the distance between the front edge of the envelope 146 and the linear transverse edge 158 of the trapezoidal opening 156 is adequate so that the image format area of the film unit 94 will be enclosed between the front and rear panels 148 and 150 of the envelope 146 when the shoulders 144 engage the closed portions 152 of the front edge of the envelope. Accordingly, unit 94 will be concealed from ambient light upon discharge of the assembly from the camera. After a suitable imbibition time has passed, the assembly of the carrier slide 134 and the film unit 94 may be withdrawn from the envelope. Because of the manner in which the unit 94 is mounted in the aperture of the carrier slide 134, the carrier slide may serve as a convenient holder by which the image formed as a positive transparency on the unit 94 may be viewed. Alternatively, the slide may be removed from the holder 134 as desired.

Thus, it will be seen that as a result of the present invention, an improved small format film pack is provided by which the above-mentioned objectives are completely fulfilled. It is contemplated that modifications and/or changes may be made in the embodiments of the invention as disclosed herein without departure from the inventive concepts manifested by such embodiments. Accordingly, it is expressly intended that the foregoing description is illustrative of preferred embodiments only, not limiting, and that the true spirit and scope of the present invention be determined by reference to the appended claims.

What is claimed is:

1. In a self-processing photographic apparatus including a camera and a film pack container normally intended to operate with a standard film pack in which film units are successively presented at a window in a marginal wall of a film pack container and allowed to be withdrawn from a slot in the container, the camera having a well to receive and position the film pack container for exposure of the film unit through the container window, a processing roller pair through which each film unit is passed for withdrawal from the film pack container and ejection from the camera, and pick means for advancing each film unit from the film pack to the pressure nip of the processing roller pair, the improvement comprising:

a plurality of film unit assemblies stacked in the film pack container, each of said assemblies including a small format film unit having peripheral dimensions smaller than the container window and sheet-like carrier means having peripheral dimensions complementing the interior dimensions of the container;

said carrier means including a carrier slide to support a said small format film unit within said carrier means to enable exposure of said unit before withdrawal of said carrier means from the container, and dark chamber means for receiving said carrier slide with its said small format film unit and for light shielding said small format film unit during and just subsequent to withdrawal of said carrier means from the container, said dark chamber means being adapted for relative movement with respect to said carrier slide so as to position said film unit within said dark chamber means as said carrier means is withdrawn from said container.

2. The apparatus recited in claim 1 wherein each of said small format film units comprises a pair of plastic sheets, said plastic sheets are substantially transparent to enable use of said small format film units after exposure and processing as positive photographic transparencies, marginal framing means to secure said plastic sheets in overlying relationship and to define an image format area in the uncovered central portion of said plastic sheets, and a processing fluid pod contained within said marginal framing means, at least one of said plastic sheets being transparent.

3. The apparatus recited in claim 2 wherein said dark chamber means comprises an envelope having front and back panels, said front panel extending in light blocking relationship with said back panel for a distance sufficient to overlie at least the uncovered central portion of said plastic sheets of said small format film unit.

4. The apparatus recited in claim 3 wherein said front and back panels close on each other along side and rear edges of said envelope and are opened at the leading edge of said envelope, said front panel having a cutout extending from said leading edge to a transverse edge spaced from the rear edge of said envelope by a distance sufficient to cover the plastic sheets of said small format film unit.

5. The apparatus recited in claim 4 wherein said cutout is dimensioned to expose at least the plastic sheets of said small format film unit through the window of the film pack container.

6. The apparatus recited in claim 4 wherein said carrier slide includes means for contacting said container to thereby resist movement thereof upon initial forward movement of said envelope by the camera pick and processing rollers and thereby allow sliding movement of said envelope relative to said slide and small film unit.

7. The apparatus recited in claim 6 wherein said carrier slide includes means for engagement by said transverse edge of said cutout to transmit pulling forces exerted by said processing rollers to said carrier slide so as to overcome said resistance and allow withdrawal of said film unit assembly from said container after exposure.

8. The apparatus recited in claim 3 wherein said envelope includes a linear leading edge, said front and rear panels closing on each other at end portions of said leading edge, said leading edge having an opening between said end portions, said carrier slide having a forwardly projecting tongue of a width to pass through said opening and a pair of abutment shoulders on opposite sides of said tongue positioned to engage said closed end portions of said leading edge.

9. The apparatus recited in claim 8 wherein said carrier slide includes a rectangular portion rearwardly of said tongue for engagement of the camera pick.

10. The apparatus recited in claim 8 wherein said carrier slide is of a thickness approximating the combined thickness of the plastic sheets of said small format film unit and is formed having an opening therein to receive said small format unit.

11. The apparatus recited in claim 9 including means to releasably secure said small format film unit in said carrier slide opening.

12. In a film pack for use in the instant camera systems in which a plurality of sheet-like film units are stacked in a container for successive presentation to a focal plane for exposure through a window in the container and discharged from the container in a direction parallel to the focal plane for passage through processing rollers and ejection through the camera system, the improvement being a film unit assembly comprising:

a small format film unit having an image receiving area and peripheral dimensions smaller than the container window;

sheet-like carrier means having peripheral dimensions which are larger than the window and complement the interior dimensions of the container; and, said carrier means comprises as a first part, an envelope having overlying front and back panels which are coextensive over an area to establish a dark chamber to cover the image receiving area of the small format units, said envelope defining a cut-out area dimensioned to position the small film unit for exposing the image receiving area; and as a second part, a carrier slide to releasably support said small format film unit for movement relative to said envelope from an exposure position in said cut-out area to a covered position in said dark chamber.

13. The film unit assembly recited in claim 12 wherein one of said first and second parts includes means for engagement by the camera processing rollers to advance said one part relative to the other of said first and second parts.

14. The film unit assembly recited in claim 12 wherein said carrier slide includes yieldable restraining means for holding said slide against movement during initial movement of said envelope to cause said dark chamber to protect said small format film unit from ambient light during its development.

15. The film unit assembly recited in claim 12 wherein said carrier slide includes a forwardly projecting tongue for engagement by the camera processing rollers to advance said slide while said envelope is initially retained in the container until said small format film unit has advanced into said dark chamber.

16. A substantially thin film unit assembly comprising:

a small format film unit of the self-processing transparency type;

an envelope having front and back panels, said envelope panels being configured to present an opening in one of said panels at least as large as the photosensitive area of said film unit; and a dark chamber adjacent said opening larger than said photosensitive area of said film unit; and a carrier slide disposed within said envelope for selective disposition at first and second positions in said envelope responsive to relative motion being effected between said envelope and said carrier slide, said carrier slide having means for releasably receiving said film unit for movement therewith between its said first and second positions, said carrier slide serving to locate said film unit in registry with said envelope opening when in its said first position to facilitate exposure of said film unit and serving to locate said film unit in said envelope's dark chamber when in its said second position to facilitate development of said film unit after its exposure.

17. The film unit assembly of claim 16 wherein said carrier slide includes a leading edge presenting a centrally disposed elongated tongue portion intermediate a pair of abutment shoulders and said envelope includes a leading edge presenting a centrally disposed opening, through which said tongue may pass intermediate a pair of enclosed portions respectively aligned with said carrier slide abutment shoulders, said tongue being substantially disposed within said envelope when said carrier slide is in its said first position and said enclosed portions of said leading edge of said envelope serving to engage said abutment shoulder of said leading edge of said carrier slide to establish said second position of said carrier slide relative to said envelope.

18. The film unit assembly of claim 16 wherein said envelope is formed of a paper-like flexible material and said carrier slide is formed of a substantially more inflexible material.

19. The film unit assembly of claim 16 wherein said carrier slide has a rearwardly folded panel adjacent the leading edge of said film unit adapted to be engaged by an external member to preclude motion of said carrier slide during forward motion of said envelope, an edge of said envelope opening being arranged to subsequently engage said carrier slide panel to establish said second position of said carrier slide relative to said envelope.

20. The film unit assembly of claim 19 wherein said envelope comprises an envelope structure formed of a paper-like flexible material and a filler formed of a substantially more inflexible material extending adjacent at least one of the peripheral edge portions of said envelope structure and attached to said envelope structure.

21. The film unit assembly of claims 16, 17, 18, 19, or 20 wherein the major surfaces of said envelope have a widthwise dimension substantially greater than that of the major surfaces of said film unit and said carrier slide serves to locate said film unit substantially centrally of opposed lengthwise extending edges of said envelope.

* * * * *